United States Patent
Ozog

(10) Patent No.: US 10,875,535 B2
(45) Date of Patent: Dec. 29, 2020

(54) TACTILE DETECTION TO DETERMINE LANE LOCALIZATION

(71) Applicant: Toyota Research Institute, Inc., Los Altos, CA (US)

(72) Inventor: Paul J. Ozog, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 12 days.

(21) Appl. No.: 16/047,576

(22) Filed: Jul. 27, 2018

(65) Prior Publication Data

US 2020/0031356 A1 Jan. 30, 2020

(51) Int. Cl.
*B60W 40/06* (2012.01)
*G05D 1/02* (2020.01)
*B60W 30/12* (2020.01)

(52) U.S. Cl.
CPC ............ *B60W 40/06* (2013.01); *B60W 30/12* (2013.01); *G05D 1/0214* (2013.01); *G05D 1/0274* (2013.01); *B60W 2420/42* (2013.01); *B60W 2552/35* (2020.02); *G05D 2201/0213* (2013.01)

(58) Field of Classification Search
CPC .. B60W 40/06; B60W 30/12; B60W 2420/42; B60W 2550/147; G05D 1/0214; G05D 1/0274; G05D 2201/0213
See application file for complete search history.

(56) References Cited

U.S. PATENT DOCUMENTS

| | | | |
|---|---|---|---|
| 8,352,112 B2 | 1/2013 | Mudalige | |
| 9,535,423 B1* | 1/2017 | Debreczeni | .......... G05D 1/0246 |
| 9,674,734 B2 | 6/2017 | Burbidge et al. | |
| 2010/0104199 A1 | 4/2010 | Zhang et al. | |
| 2010/0191461 A1 | 7/2010 | Zeng | |
| 2012/0150437 A1 | 6/2012 | Zeng et al. | |
| 2016/0339959 A1* | 11/2016 | Lee | ....................... B60W 30/12 |
| 2017/0008521 A1* | 1/2017 | Braunstein | ............. G01C 21/32 |
| 2017/0243370 A1* | 8/2017 | Hoye | ......................... B60R 1/10 |
| 2018/0218596 A1* | 8/2018 | Castelli | ................. H04W 76/10 |
| 2019/0102959 A1* | 4/2019 | Saylor | .................. G07C 5/0808 |

FOREIGN PATENT DOCUMENTS

| CN | 102815305 A | 12/2012 |
|---|---|---|
| CN | 104870288 A | 8/2015 |

* cited by examiner

*Primary Examiner* — Navid Ziaeianmehdizadeh
(74) *Attorney, Agent, or Firm* — Christopher G. Darrow; Darrow Mustafa PC

(57) ABSTRACT

The systems and methods described herein disclose localization of a vehicle based on tactile events. As described here, the vibrations produced by objects in an environment as a vehicle encounters them can be used to determine the position and orientation of the vehicle. The systems and methods can include detecting at least one tactile event in an environment, during the operation of a vehicle. A tactile survey map can then be accessed to correlate surveyed tactile events to an event location in the environment. The detected tactile events can then be compared to the tactile survey map. Then, the event location and the tactile correlation can be applied to determine the vehicle location in the environment.

20 Claims, 6 Drawing Sheets

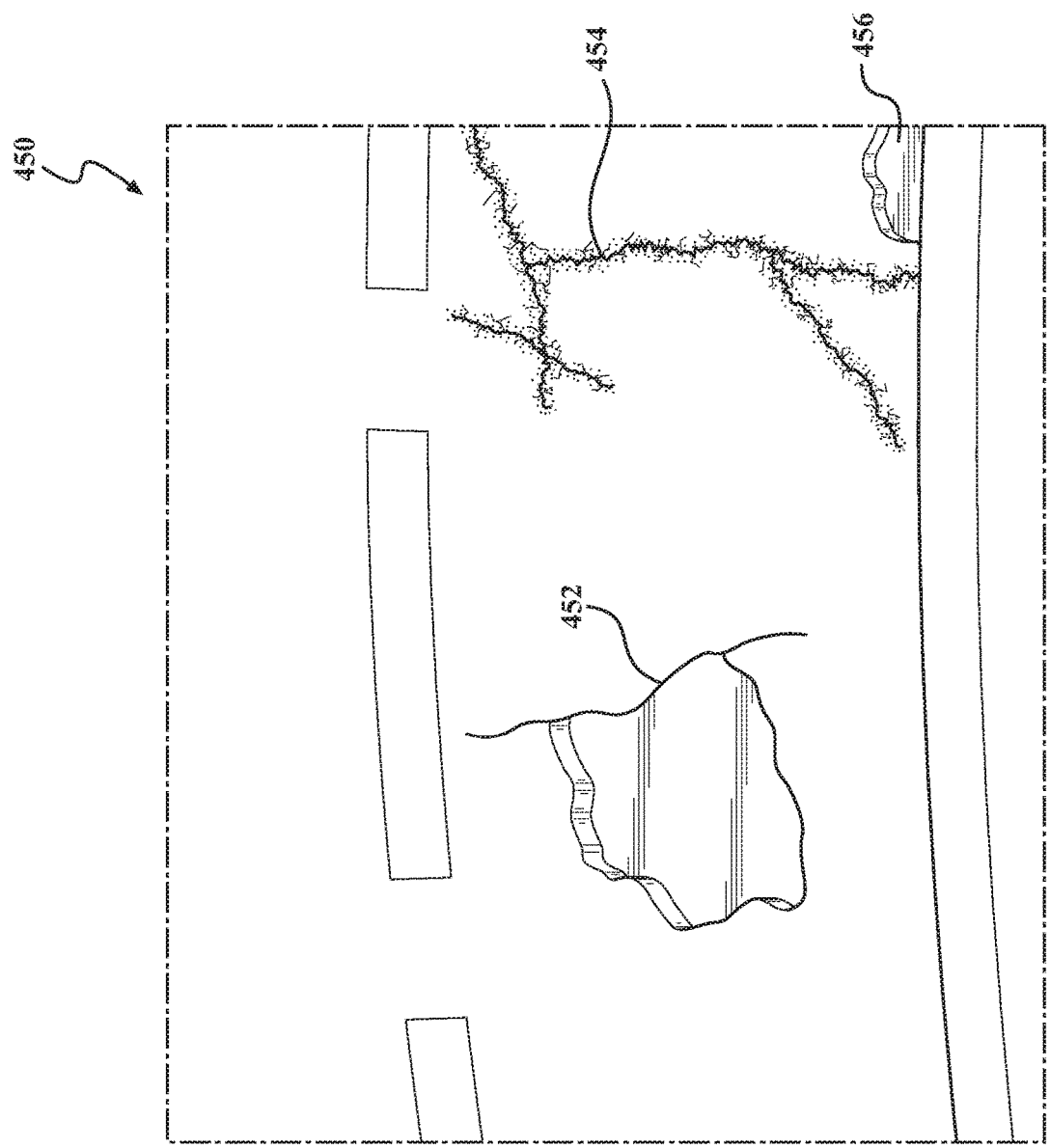

TACTILE DETECTION TO DETERMINE LANE LOCALIZATION

TECHNICAL FIELD

Embodiments described herein generally relate to autonomous vehicles. More specifically, the embodiments generally relate to systems and methods of determining vehicle position during autonomous driving.

BACKGROUND

Operation of a motor vehicle has been common place for over a century. When vehicles are operated by a human operator, the operator can mentally take account of various road details, such that the vehicle is generally positioned in the appropriate area of the road. In autonomous systems, localization information is generally based on geometric primitives and includes lane markers, poles, signs, and other facets of the environment. This localization information can be perceived using sensors such as LiDAR, cameras, and other environmental sensors.

SUMMARY

The systems and methods described herein include determination of operator proficiency and control of one or more vehicle systems in light of said proficiency. In one embodiment, a tactile localization system for determining vehicle position is disclosed. The tactile localization system can include one or more processors and a memory communicably coupled to the one or more processors. The memory can store a measurement module including instructions that when executed by the one or more processors cause the one or more processors to detect, using one or more sensors, at least one tactile event in an environment, during operation of a vehicle. The memory can further store a comparison module including instructions that when executed by the one or more processors cause the one or more processors to determine an event location in the environment for the at least one detected tactile event using a tactile survey map. The memory can further store a localization module including instructions that when executed by the one or more processors cause the one or more processors to determine a location of the vehicle in the environment based at least on the event location, and to control the vehicle in the environment with relation to the vehicle location.

In another embodiment, a non-transitory computer-readable medium for determining vehicle position is disclosed. The non-transitory computer-readable medium can store instructions that when executed by one or more processors cause the one or more processors to detect, using one or more sensors, at least one tactile event in an environment, during operation of a vehicle. The non-transitory computer-readable medium can further store instructions to determine an event location in the environment for the at least one detected tactile event using a tactile survey map. The non-transitory computer-readable medium can further store instructions to determine a location of the vehicle in the environment based at least on the event location. The non-transitory computer-readable medium can further store instructions to control the vehicle in the environment with relation to the vehicle location.

In another embodiment, a method for determining vehicle position is disclosed. The method can include detecting, using one or more sensors, at least one tactile event in an environment, during operation of a vehicle. The method can further include determining an event location in the environment for the at least one detected tactile event using a tactile survey map. The method can further include determining a location of the vehicle in the environment based at least on the event location. The method can further include controlling the vehicle in the environment with relation to the vehicle location.

Embodiments of the present application can be more clearly understood with relation to the figures and the description below.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

FIGS. 4A and 4B depicts an operator in a vehicle incorporating the tactile localization system, according to embodiments described herein.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Systems and methods described herein localize the vehicle through a tactile feel of the road, including bumps, potholes, and other features that may be detected. Without intending to be bound by theory, a roadway is understood to have a unique surface configuration. The surface configuration can include random bumps, differences in roughness (e.g., freshly paved vs. old and coarse), areas with potholes or a series of potholes, rumble strips, bridge decks, and so on. Thus, the systems and methods described herein use an awareness of these aspects of the roadway in order to localize a vehicle.

Thus, a survey vehicle can map the surface features of the road using an inertial measurement unit (IMU) or other sensor of the vehicle. An IMU, in this instance, is an electronic device that measures and reports the vehicle's specific force, angular rate, and sometimes the magnetic field surrounding the body. The IMU can include devices and sensors which are sensitive to changes in inertia, magnetic fields or electric fields, such as accelerometers, gyroscopes, magnetometers, or others. This information can then be provided as part of a map to a recipient vehicle. As the recipient vehicle proceeds along a segment of road, the recipient vehicle can collect surface feature data. The recipient vehicle can then compare perceived surface features of the road with the surface feature map to localize the vehicle.

In a further embodiment, the stored data provides a continuous or semi-continuous roadway signature of the features that are unique to each lane for lateral localization and also along each lane for longitudinal localization. Accordingly, each lane generally has a "roadway signature" in the form of the tactile surface features that are unique to each lane and roadway. The surface feature map itself can include IMU data (i.e., acceleration profiles experienced by driving over the roadway features). However, in further aspects, the surface feature map may also include other data sources, such as acoustic data that is perceived as the tires travel over the various surfaces and generate different acoustic profiles. Embodiments of the present application can be more clearly understood with relation to the figures and the description below.

Figure 1:
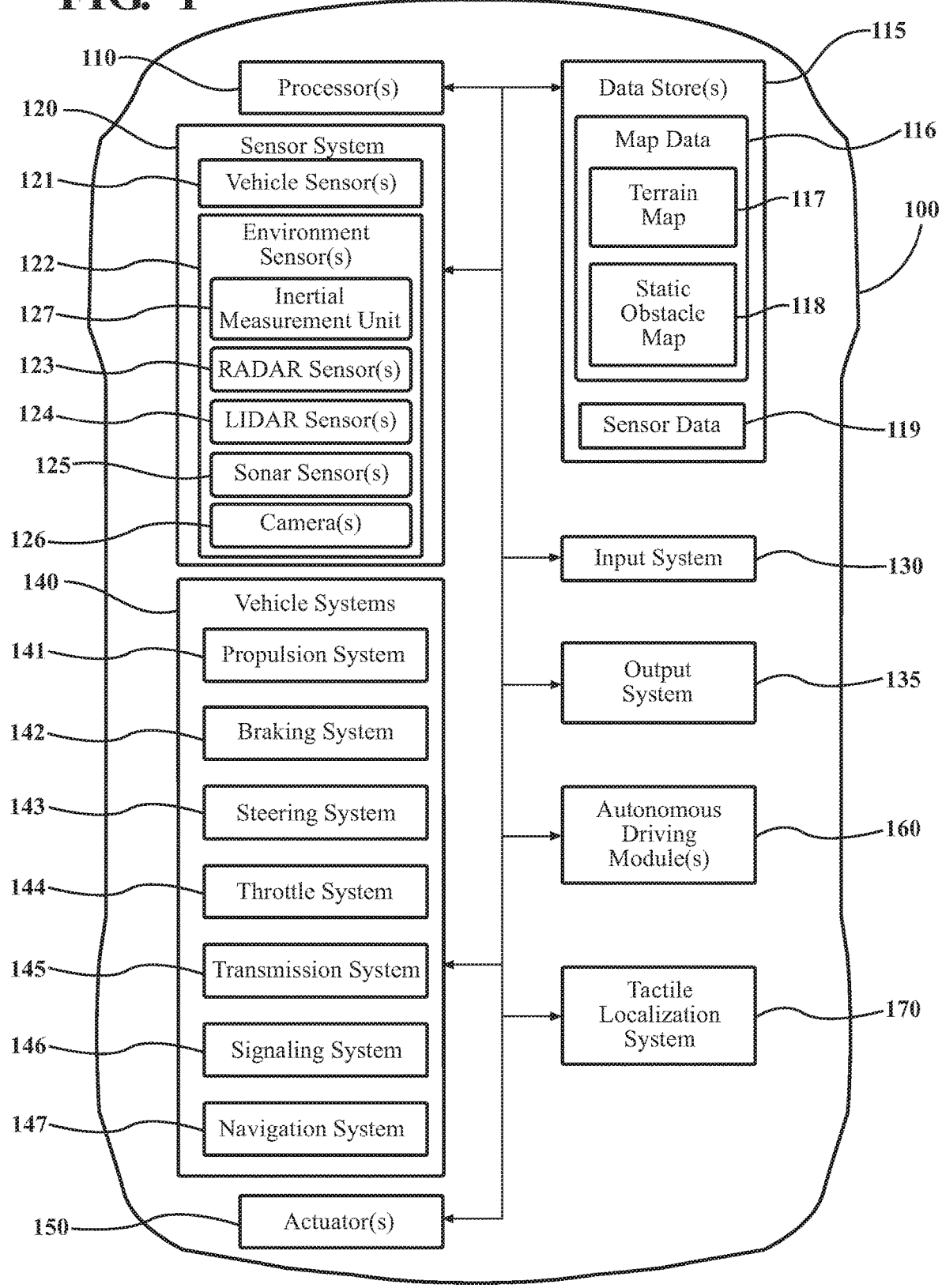
FIG. 1 is a block diagram of a vehicle useable as part of a tactile localization system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include a tactile localization system 170 or capabilities to support a tactile localization system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those of skill in the art, however, will understand that the embodiments described herein may be practiced using various combinations of these elements.

Figure 2:
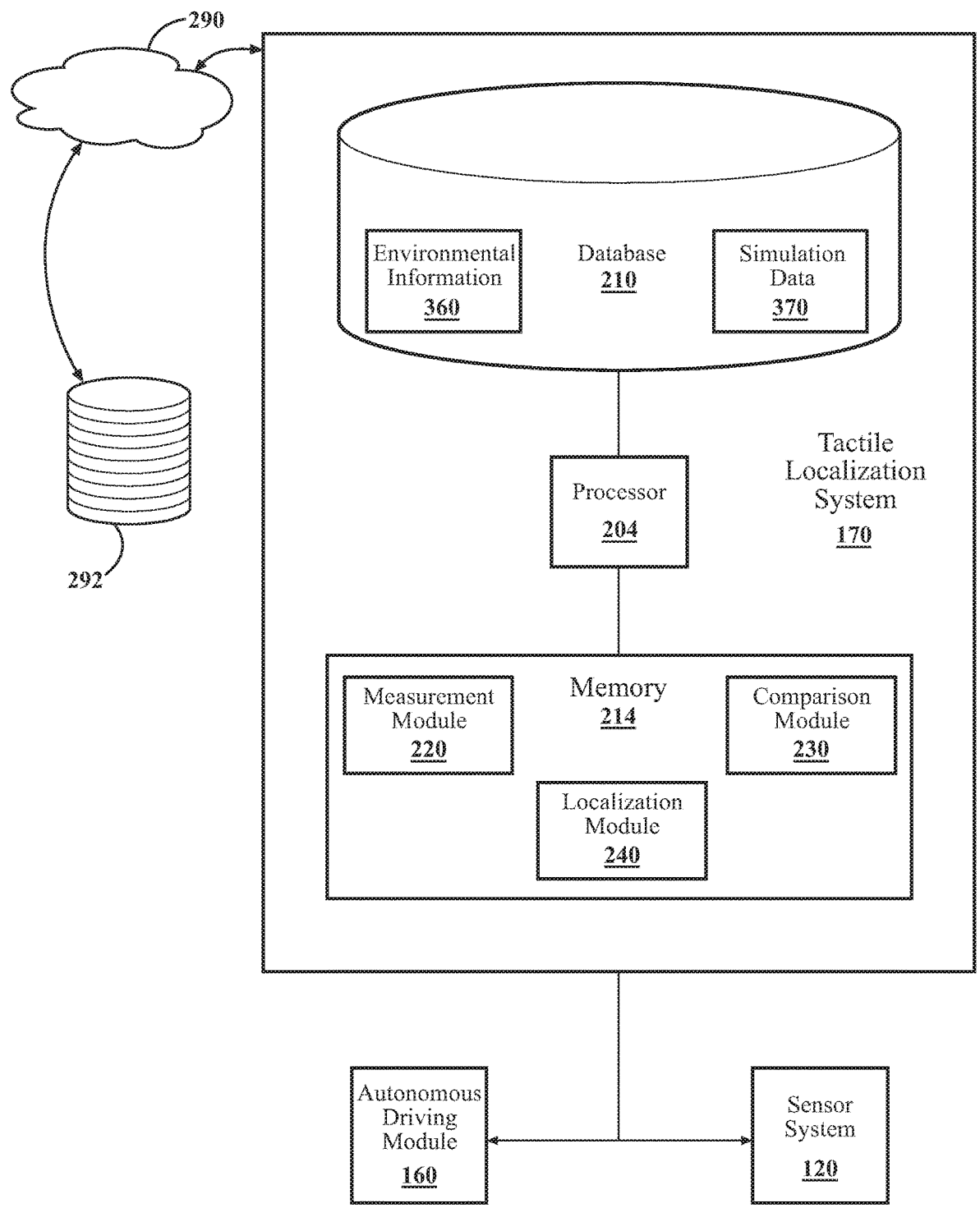
FIG. 2 is an illustration of the tactile localization system for determining vehicle localization in an environment, according to embodiments described herein.

The tactile localization system 170 is more clearly described with reference to FIG. 2. The tactile localization system 170 is shown as including the processor 110 from the vehicle 100, depicted in FIG. 1. Accordingly, the processor 110 can be a part of the tactile localization system 170, the tactile localization system 170 can include a separate processor from the processor 110 or the tactile localization system 170 can access the processor 110 through a data bus or another communication path. In one embodiment, the tactile localization system 170 includes the memory 214 that stores a measurement module 220, a comparison module 230 and a localization module 240. The memory 214 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

The measurement module 220 can generally include instructions that function to control the processor 110 to access a tactile survey map 260. The tactile survey map 260 is a map of one or more surveyed tactile events in a region which is spatially coordinated. The surveyed tactile events are the physical response of the recipient vehicle to encountering one or more objects in the environment (e.g., one or more environmental objects). The surveyed tactile events can include sensor data collected from one or more sensors, such as sensor data collected from an IMU. The environmental objects can be stored as part of an tactile survey map 260. The tactile survey map 260 can include a collection of information regarding all detectable objects in the environment, as well as information specific to the tactile events. The tactile survey map 260 can include objects which affect the road, objects which can affect the recipient vehicle, objects detectable by sensors available to the recipient vehicle, objects detectable to available sensors generally or others. In one example, the tactile survey map 260 can include signs, foliage, roads, formations on roads (e.g., potholes, cracks, etc.), and other objects detectable in an environment.

The surveyed tactile events can be measured events (e.g., an actual vibration received or detected by the recipient vehicle) or anticipated events. Anticipated events are a tactile event which is expected from collision with the environmental object but that has not yet occurred, based on characteristics of the object, position, shape, size of the environmental object. In one example, a pothole or rock detected in the center of the road, though passed over by the recipient vehicle without collision with the environmental object, can be detected as an anticipated event and mapped to the tactile survey map 260. The surveyed tactile events can be correlated to an event location on the tactile survey map 260, such that encountering one or more surveyed tactile events can give the recipient vehicle an awareness of the position of the recipient vehicle on the tactile survey map 260, and in the environment. The event location is the location where the surveyed tactile event occurs within the environment. The event location can be related to the location in the environment of at least a portion of the environmental object. The tactile survey map 260 can further include location and orientation information regarding the tactile events. In one embodiment, the tactile survey map 260 includes position of a tactile event on a coordinate plane, including variations of the tactile event based on point of contact with the recipient vehicle, such as the vehicle 100. The variations in the tactile event, as positioned on the coordinate plane can establish the orientation of the environmental object creating the event.

The tactile survey map 260 may be created or made available to the recipient vehicle in a variety of ways. The tactile survey map 260 can be created through a number of sources, such as during manual driving of a recipient vehicle, during autonomous driving of the recipient vehicle with a separate vehicle localization system in place, by a survey vehicle, or by others. The survey vehicle and the recipient vehicle can be substantially similar to the vehicle 100. In further embodiments, the tactile survey map 260 can be compiled by one or more recipient vehicles. In this embodiment, the tactile localization system 170 can detect one or more tactile events through the measurement module 220. The measurement module 220 of each of the one or more recipient vehicles can upload the detected tactile events based on location to a preexisting or newly made tactile survey map. The location of the tactile events can be determined by secondary sources, such as triangulation with other known detected objects, GPS telemetry or others.

The measurement module 220 can further include instructions to detect at least one tactile event in an environment during the operation of the recipient vehicle. During the operation of the recipient vehicle, the recipient vehicle can encounter one or more of the environmental objects, creating the tactile events associated with the environmental objects. The tactile events can be detected using one or more sensors on the recipient vehicle. In one embodiment, the vehicle 100 detects the tactile event using the sensor system 120. In further embodiments, the at least one tactile event can be a predicted tactile event. In one or more embodiments, the recipient vehicle can detect one or more objects in the environment that, if contacted, are expected to produce a tactile event. In this embodiment, the recipient vehicle can include information about the predicted tactile event, including the location of the event, the signature of the event (i.e., tactile signature), or other details which can be used in detecting tactile events for localizing the recipient vehicle.

As the recipient vehicle detects tactile events, information about the events and the environment during the detection can be collected by the recipient vehicle. Each feature of a road, or object in the environment, is expected to have a tactile signature. The tactile signature of a tactile event is the measurement of the tactile event over a period of time, based on orientation of contact with the object, speed of contact, and other facets of the vehicle movement with relation to the object producing the tactile event. The tactile signature of the tactile event can differentiate one tactile event from another or one object from another. Further, the tactile signature can be used as another unique environmental point, such as for triangulating the location of the recipient vehicle in the environment. In one example, the vehicle 100 comes in contact with a pothole, the pothole creating a tactile event with a tactile signature. The tactile signature can further be stored as part of the detection information and/or incorporated into the tactile survey map 260. The pothole, being at a known location in the tactile survey map 260 is included as a detected tactile event alongside other detected tactile events, and other objects in the environment detected by other sensor types and systems. The detected tactile events can be stored as part of the detection information 270. The detection information 270 can be stored as part of the database 210.

The detection information 270 and the tactile survey map 260 can then be made available to the comparison module 230. The comparison module 230 can generally include instructions that function to control the processor 110 to determine an event location in the environment for the at least one detected tactile event using a tactile survey map 260. One or more detected tactile events can be applied to the recipient vehicle, to create a tactile correlation. Tactile correlation refers to the relationship on the tactile survey map between tactile events, detected objects, and the recipient vehicle. The comparison module 230 can access or collect sensor information from one or more sources, such as the sensor system 120 of the vehicle 100. In further embodiments, sensor information can include information collected remotely, such as through vehicle to infrastructure (V2I) communication or vehicle-to-vehicle (V2V) communication. In one example of a recipient vehicle employing the tactile localization system 170, the recipient vehicle can access images generated from an image capture device regarding a known location. These images can be referenced alongside sensor data collected from the sensor system 120 to create a tactile correlation between an object in the environment and the detected tactile event. One skilled in the art will understand the breadth of combinations disclosed here, without further explicit recitation.

The tactile correlation can include the interrelationship of the location and orientation of the detected tactile events. In one example, the tactile correlation includes the temporal difference in tactile signature between two or more detected tactile events. As such, the tactile correlation can include a variety of details about the recipient vehicle and the environment, such as the location, orientation, velocity, acceleration, change in acceleration, wheel position, and other information regarding the recipient vehicle as detected through the tactile event. Thus, the tactile correlation can provide information including the pose of the recipient vehicle, the location of the recipient vehicle in the lane, the global position of the recipient vehicle and actions taken by the recipient vehicle. The tactile correlation the detected tactile event can be stored as part of the detection information 270 in the database 210.

The localization module 240 generally includes instructions that function to control the processor 110 to determine a location of the vehicle in the environment based at least on the event location. As above, the tactile event is associated with a specific three (3) dimensional location on the tactile survey map. Thus, the tactile event is associated with an assigned geographical location and is understood to be an event which occurs at the assigned geographical location. By detecting the tactile event, the recipient vehicle is detecting a location on the tactile survey map. Thus, the detected tactile event can be applied in a number of ways to localize the recipient vehicle in the environment, to update the tactile survey map or others.

The localization module 240 can further include instructions to access the detected tactile event, as stored, such as in the database 210, or as presented to the localization module 240. The localization module 240 can then use the detected tactile event to determine the location of the recipient vehicle. The location of the recipient vehicle can include the geographical location, the lane position, the lane localization (the position of the vehicle within the lane), and others. Further, the tactile event can be expected to be detected differently depending on at least the speed and the direction of the recipient vehicle. As such, the tactile event can provide information on the orientation of at least a portion of the recipient vehicle. For example, a pothole can create a different vibration pattern when the recipient vehicle is travelling at different speeds or approaching from a different position.

In further embodiments, the localization module 240 can determine the previous position of the recipient vehicle based on the detected tactile event. As described previously, the detected tactile events are expected to produce a unique tactile signature based on both the object contacted and the orientation that the vehicle contacts the object from (e.g., a prior position. As such, the localization module 240 can include instructions to use the tactile signature of the tactile event and the tactile correlation to determine one or more previous positions of the recipient vehicle. In this way, the tactile localization system 170, through the localization module 240, can use tactile events to both determine current localization of a vehicle in the environment and to determine a vehicle position between the detected tactile events on a vehicle route in the environment. The determined vehicle positions can be used to place uncorrelated tactile events on the tactile survey map. Uncorrelated tactile events are detected tactile events that are detected by a recipient vehicle but do not have equivalent information on the tactile survey map. By using detected tactile events having a correlation and determining previous route positions, the uncorrelated tactile events can be positioned in the environment.

The localization module 240 can further include instructions to navigate the recipient vehicle in the environment using the vehicle location. Once the details of the location are known, the localization module 240 can provide instructions to one or more systems, such as the autonomous driving module(s) 160, for controlling the movement of the recipient vehicle. In one embodiment, the localization module 240 forwards the location information for the vehicle 100 to the autonomous driving module(s) 160. Here, the autonomous driving module(s) 160 then accesses the appropriate control model and controls the movement of the vehicle 100 accordingly. In further embodiments, the localization module 240 provides instructions to the autonomous driving module(s) 160 for controlling the one or more vehicle systems 140, thus controlling the movement of the vehicle 100. The determined location can then be stored as part of the detection information 270, to be used for metrics, refinement of the tactile survey map or for other purposes.

Figure 3:
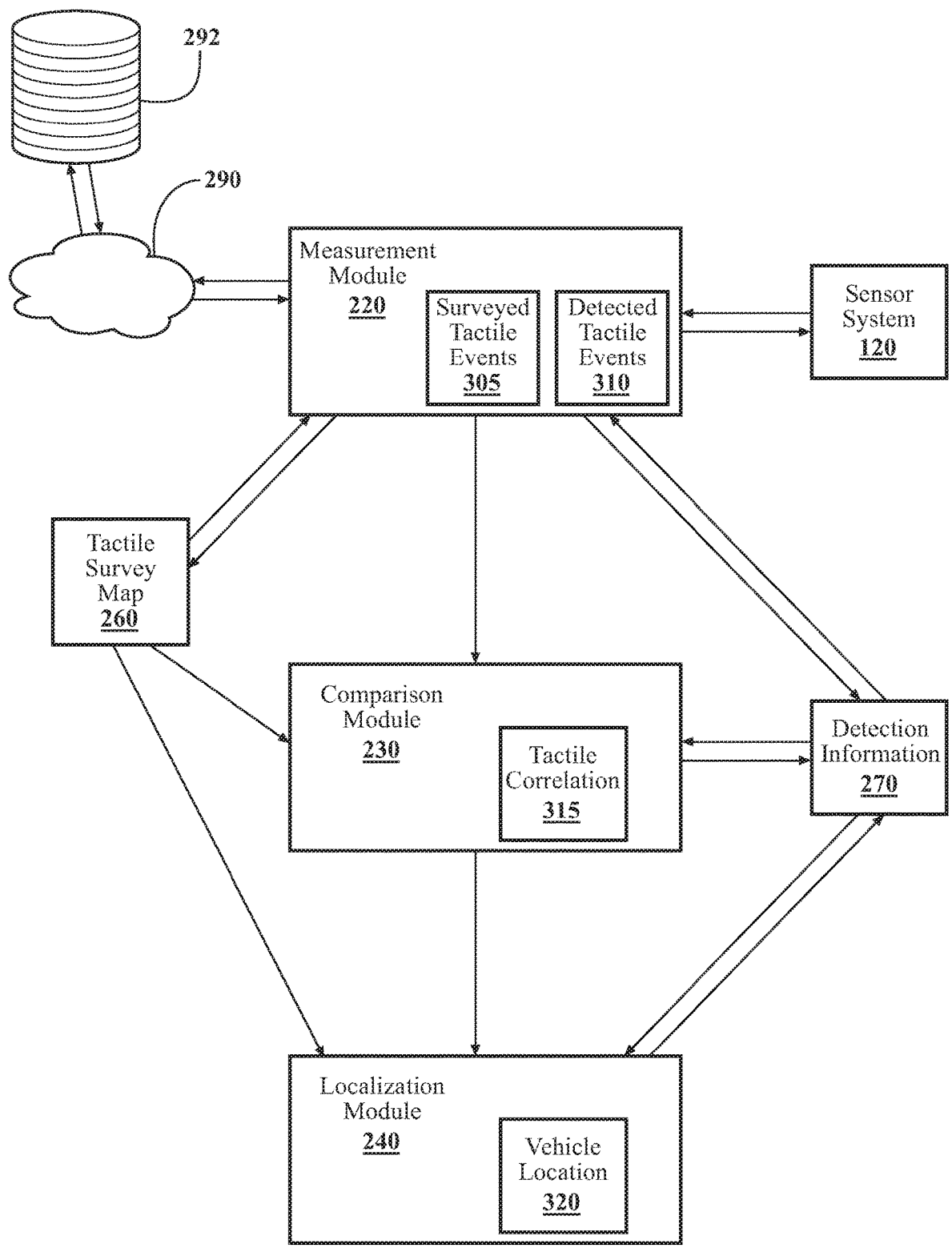
FIG. 3 is a schematic of the tactile localization system, according to one or more embodiments.

FIG. 3 depicts a schematic of the tactile localization system 170, according to one or more embodiments. The tactile localization system 170 detects a tactile event in the environment through the measurement module 220. The tactile event can then be compared to known tactile events using the comparison module 230. Once compared, the localization module 240 can determine the location of the vehicle in the environment. As well, the localization module 240 can provide instructions for modification of lane position, as appropriate. Thus, through the use of the tactile localization system 170, the vehicle can use the tactile events in addition to, or as a proxy for, imaging sensors and GPS devices, in precisely localizing the vehicle in the environment.

As shown here, the measurement module 220 begins with receiving a tactile survey map 260. The tactile survey map 260, including surveyed tactile events 305, can be used to give reference to detections made by the measurement module 220. The tactile survey map 260 can be delivered before, after, or simultaneously with an input from a sensor system, such as the sensor system 120. The information received can include information about the environment and surroundings and information regarding vehicle performance in said environment, such as additional surveyed tactile events 305 and detected tactile events 310. The sensors of the sensor system 120 can include IMUs, image capture devices, audio capture devices, LIDAR, RADAR, and others. The information received can then be processed by the measurement module 220 to stored and processed to detection information 270 and updates to the tactile survey map 260, described above with reference to FIG. 2. The detection information 270, including the surveyed tactile events 305 and detected tactile events 310, and the tactile survey map 260 can then be forwarded to the to the comparison module 230.

The comparison module 230 can then compare the surveyed tactile events 305 and the detected tactile events 310. Initially, the comparison module 230 receives the detected tactile events 310. The comparison module 230 can then use further information received as part of the detection information 270, such as GPS data, imaging data or other information relating to the vehicle position as provided by the sensor system 120, to determine likely surveyed tactile events 305 which match the detected tactile events 310. The comparison of the surveyed tactile events 305 and the detected tactile events 310 forms the tactile correlation 315. The tactile correlation 315 can be substantially similar to the tactile correlation described with reference to FIG. 2.

The comparison module 230 can further include instructions to update one or more information sets, such as the tactile survey map 260 and the detection information 270. The detection information 270 can be updated using information from the tactile correlation 315. In one example, the detection information can be updated using parameters of the surveyed tactile event 305 which were not detected or detected differently in the detected tactile events 310. In further embodiments, the tactile survey map 260 can be updated using the tactile correlation 315. In another example, the detected tactile events 310 can be used to update or augment the location and detection parameters of the surveyed tactile event 305. The comparison module 230 can then forward the tactile correlation 315 to the detection information 270 and/or the localization module 240.

The localization module 240 can then include instructions to apply the tactile correlation 315 to the tactile survey map 260 to determine the vehicle location 320. The tactile correlation 315 includes information about the detected tactile events 310, the sensor data as received from the sensor system 120, and others. The tactile correlation 315 is then applied to the tactile survey map 260 to determine the vehicle location 320. The vehicle location can include the geographical location of the vehicle, the lane level localization of the vehicle, the orientation of the vehicle, speed and direction information about the vehicle, expected future positions of the vehicle, and other location related information.

Using the known location, the localization module 240 can then provide instructions to perform a number of functions regarding the vehicle, including controlling the vehicle, provide the location of the vehicle to a remote source, act as a localization database for the autonomous driving module(s) 160, or others. Thus, the tactile localization system 170 can use the tactile information about the vehicle to determine the location and control the vehicle, thus providing numerous benefits to the operator and to the public. The tactile localization system 170 increase safety in the environment by controlling vehicle location in the environment autonomously and in the absence of traditional indicators, such as during inclement weather. Further, the tactile localization system 170 can increase precision of autonomous guidance through better pinpointing of vehicle location in an environment.

In further embodiments, the tactile data can also be fused with the more traditional localization systems. Traditional localization systems can include systems based on geometric primitives. The term geometric primitive, as used herein, describes the simplest (i.e., 'atomic' or irreducible) geometric objects that the system can handle (draw, store). Geometric primitives can include simple geometric shapes such as a cube, cylinder, sphere, cone, pyramid, torus. The geometric primitives can be represented using a series of points and straight line segments or other forms of simple vector graphics. In one embodiment, the tactile data can be fused using a Bayesian filter. A Bayesian filter, also known as recursive Bayesian estimation, is a general probabilistic approach for estimating an unknown probability density function recursively over time using incoming measurements and a mathematical process model. The Bayesian filter can apply a Markovian probability distribution to fuse one or more geometric primitives with both tactile data and geometric data, as described above.

Thus, using the tactile localization system 170, the vehicle can use information provided by vibrations in an environment to determine the global and lane level localization of the vehicle. By using the tactile localization system 170, the vehicle can localize in an environment when other sources of localization are obscured. Further, the tactile localization system 170 can provides more precise localization than preexisting methods, thus allowing for better vehicle control and prediction.

Figure 4A:
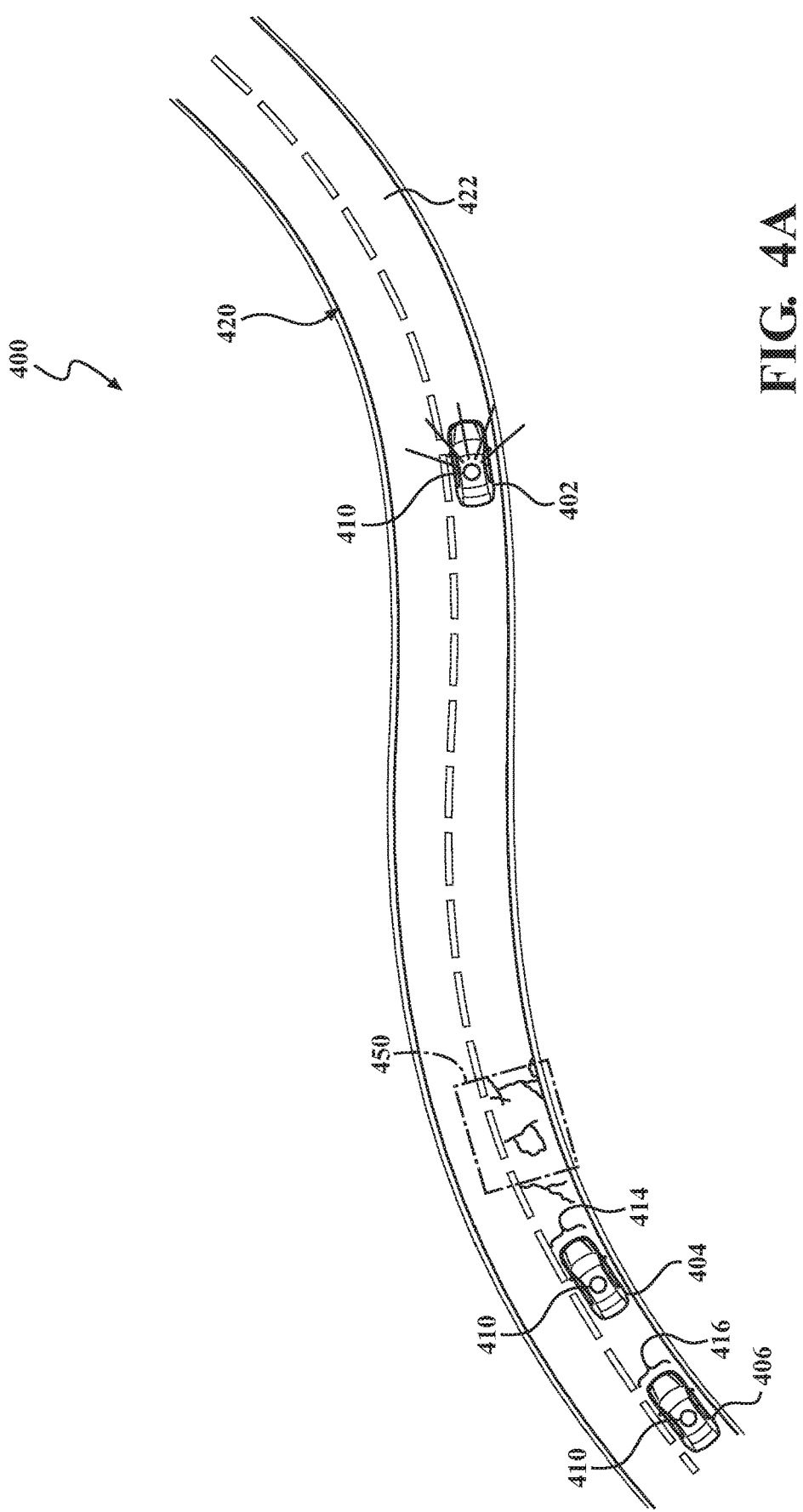

FIGS. 4A and 4B depicts a plurality of vehicles employing the tactile localization system 170, according to one or more embodiments. FIG. 4A depicts an environment 400 including a survey vehicle 402 and the recipient vehicles 404 and 406 on the road 420. The plurality of vehicles, including a survey vehicle 402, the first recipient vehicle 404 and the second recipient vehicle 406, are located on the road 420 in the environment 400. The survey vehicle 402, the first recipient vehicle 404 and the second recipient vehicle 406 can include a sensor system 410. The plurality of vehicles can collect and apply tactile information from the environment 400 to localize the vehicles, such as to a specific location on a road 420. Once the plurality of vehicles are localized, the tactile localization system 170 can provide instructions for autonomous control of the vehicle. Initially, the tactile localization system 170 can begin with the survey vehicle 402. The survey vehicle 402, as described above, can survey an environment 400 for one or more tactile events.

FIG. 4B depicts and exploded view 450 of the road 420, showing detail regarding one or more objects producing one or more tactile events, according to embodiments disclosed herein. The one or more surveyed tactile events can include both detected tactile events and anticipated tactile events, as received by the survey vehicle 402. As described above, the detected tactile events are events which created a tactile response for the survey vehicle. An example of an object in the environment 400 which produces a detected tactile event is a first pothole 452 and a crack 454, as shown in the exploded view 450 in FIG. 4B. The first pothole 452 and the crack 454 are part of the vehicle driving path and the survey vehicle 402 will interact with the objects during the drive on road 420. The anticipated tactile events are events which are expected or anticipated from objects in the environment, with or without an actual tactile response from the survey vehicle. An example of an object in the environment 400 which produces an anticipated tactile event is a second pothole 456, as shown in the exploded view 450 in FIG. 4B. The second pothole 456 is not part of the vehicle driving path and the survey vehicle 402 will not interact with the object during the drive on road 420, unless the survey vehicle 402 changes course or is forced to evade. In one or more embodiments, there may be a detected tactile event and an anticipated tactile event from the same object. For example, an object may produce a detected tactile event, as measured from one or more directions, and an anticipated tactile event as expected from one or more alternate directions.

The survey vehicle 402 can move along a route in the environment, such as the road 420. As it continues along the route, the survey vehicle 402 can collect information on all available tactile events which are present along the road 420. The survey vehicle can collect the tactile events, including the tactile signature, and the distance between tactile events and other objects in the environment 400. In one embodiment, the tactile events can be differentiated based on a combination of unique features and comparative features. Unique features of the tactile events can include the tactile signature of the tactile event, the shape of the object causing the tactile event, changes in the tactile signature based on speed, and others. Comparative features of the tactile event can include distance between the tactile event and an object in the environment, distance between two tactile events, and others. Though this embodiment shows the tactile localization system 170 as including the survey vehicle 402, this is not necessary. Further embodiments may have maps which are derived from other sources, as described above with reference to FIG. 2.

Once the survey vehicle 402 has collected information about the tactile events, the tactile events can then be associated with a tactile survey map. The tactile survey map can be a map which includes both object and tactile event locations within the environment. The tactile survey map can be derived from numerous sources, as described above with reference to FIG. 2. The positions and locations of the tactile events are then added to the tactile survey map with proper correlation to the real world location of the object which created the tactile event. The tactile survey map is then uploaded to a database, such as the database 210, described with reference to FIG. 2.

Recipient vehicles 404 and 406 can detect tactile events in the environment 400, using a sensor system, such as the sensor system 410. The recipient vehicle 404 and 406 can begin by travelling on the road 420. The recipient vehicle 404 and 406 can collect the detected tactile events along the route, based on vibrations which occur when the vehicle encounters an object on the road 420. The detected tactile events can include the tactile events produced by the first pothole 452 and the crack 454. The detected tactile events, as received by the recipient vehicle 404 and 406, can then be stored as part of the detection information 270. In further embodiments, the detected tactile events, described here, can be incorporated into the tactile survey map 260.

The first recipient vehicle 404 and the second recipient vehicle 406 can then, through the measurement module 220, access the tactile survey map. The first recipient vehicle 404 and the second recipient vehicle 406 can then create an inventory of detected tactile events from the recipient vehicles 404 and 406 and the tactile events from the tactile survey map. In further embodiments, the first recipient vehicle 404 and the second recipient vehicle 406 can further contribute to the tactile survey map using information collected as part of the measurement module 220. At this point, the detected tactile events can be added to the tactile survey map or used to adjust detected tactile events or anticipated tactile events which are already on the tactile survey map. Tactile events from the first recipient vehicle 404 and the second recipient vehicle 406 can also be compared between the vehicles for the purpose of properly updating the tactile survey map.

The first recipient vehicle 404 and the second recipient vehicle 406 can then, through the comparison module 230, compare the detected tactile event to the tactile events from the tactile survey map. The first recipient vehicle 404 and the second recipient vehicle 406 establish which tactile events from the tactile map correspond with the tactile events collected from the environment. The tactile events, as collected by the first recipient vehicle 404 and the second recipient vehicle 406 are collected sequentially from the road 420 and as a function of time. As shown here, the first recipient vehicle 404 and the second recipient vehicle 406 pass over the first pothole 452 and the crack 454 producing two distinct tactile events, including the tactile signature, which reflect the formation of the first pothole 452 and the crack 454.

The tactile events from the first recipient vehicle 404 and the second recipient vehicle 406 are then compared to tactile events from the tactile survey map to create a tactile correlation. The tactile correlation includes portions of the tactile event, as well as a mathematical data, which establish the level of correlation between the tactile events. In this example, the first recipient vehicle 404 and the second recipient vehicle 406 passed over the first pothole 452 and the crack 454 at a first speed, which produced a first tactile event and a second tactile event at the sensor system 120. As the speed, angle of impact, vehicle size and other features can vary between the survey vehicle 402, the first recipient vehicle 404, and the second recipient vehicle 406, the first tactile event and the second tactile event, as detected, is expected to differ between the survey vehicle 402, the first recipient vehicle 404, and the second recipient vehicle 406. The tactile correlation uses shared features about each of the tactile events to establish the level of similarity between the events, for later use in localization and mapping.

The localization module 240 can then determine the current position of the vehicles and create guidance for later vehicle movements. The first recipient vehicle 404 and the second recipient vehicle 406 may be determined to be at a first position 414 and a second position 416 in a lane 422 based on the first tactile event and the second tactile event. In embodiments where the lane position of the first recipient vehicle 404 and the second recipient vehicle 406 are determined to be appropriate, the localization module 240 can include instructions to maintain position or otherwise not affect the current location. In other embodiments, the localization module 240 can include instructions to reposition the first recipient vehicle 404 and the second recipient vehicle 406 in the lane 422 such that the lane position is appropriate for driving. In a further embodiment, the second recipient vehicle 406 can detect a third tactile event at the second pothole 456. The third tactile event can correlate with at least one of the one or more anticipated tactile events from the tactile survey map, giving further information regarding the lane position of the second recipient vehicle 406.

The tactile localization system 170 can thus provide numerous benefits for the vehicles in an operating environment. As shown regarding the first recipient vehicle 404 and the second recipient vehicle 406, the tactile localization system 170 can help with very precise localization of the vehicle within a lane, as tactile events will vary even on the same object in the environment. Further, during events where standard localization would fail, the tactile localization system 170 will continue to function as visibility is not necessary for localization. This ensures a more safe operation of the vehicle within a given environment, and precision is expected to increase over time.

Figure 5:
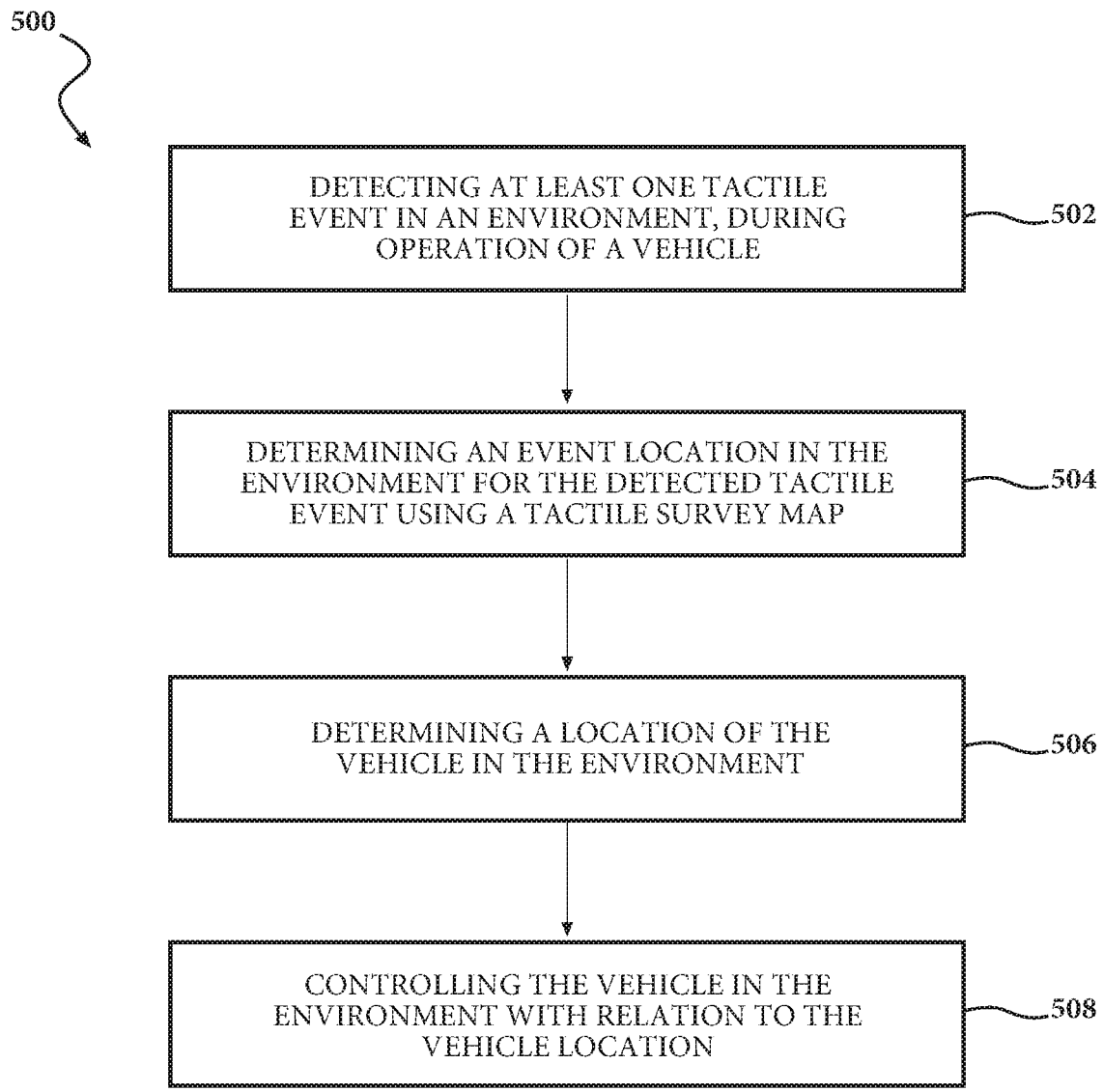
FIG. 5 is a block diagram of a method for determining vehicle localization in an environment, according to one or more embodiments.

FIG. 5 is a block diagram of a method for determining vehicle localization in an environment, according to one or more embodiments herein. The method can include a survey of the tactile events in the environment, comparison of detected tactile events to the survey, determination of location based on the comparison and correction of vehicle location if necessary. Thus, the vehicle can use vibrations in the environment to reposition and navigate in a safe manner.

As described herein, the method 500 can detecting at least one tactile event in the environment during the operation of a vehicle, at 502. An event location can be determined in the environment for the at least one detected tactile event using a tactile survey map, at 504. A location of the vehicle can be determined in the environment based at least on the event location, at 506. The vehicle can then be controlled in the environment with relation to the vehicle location, at 508.

The method 500 can begin by detecting at least one tactile event in the environment during the operation of a vehicle, at 502. During the operation of the recipient vehicle, the recipient vehicle can encounter one or more of the environmental objects, creating the tactile events associated with the environmental objects. The method 500 can include detecting the tactile events, such as by using one or more sensors on the recipient vehicle. In further embodiments, the at least one tactile event can be a predicted tactile event. In one or more embodiments, the recipient vehicle can detect one or more objects in the environment that, if contacted, are expected to produce a tactile event. In this embodiment, the recipient vehicle can include information about the predicted tactile event, including the location of the event, the signature of the event, or other details which can be used in detecting tactile events for localizing the recipient vehicle. As the recipient vehicle detects tactile events, information about the events and the environment during the detection can be collected by the recipient vehicle. The tactile signature of the tactile event can differentiate one tactile event from another.

The detection of tactile events can be performed as part of a system, such as the tactile localization system 170, described with reference to FIG. 2. The tactile localization system 170 can include a measurement module 220. The measurement module 220 can generally include instructions that function to control the processor 110 to access a tactile survey map. The detected tactile events can be substantially similar to the detected tactile events 310, described with reference to FIGS. 2 and 3. The detected tactile event 310 and the tactile signature of the detected tactile event 310 can be stored as part of the tactile survey map 260. The tactile survey map 260 can be stored in a database, such as the database 210, described with reference to FIG. 2.

An event location can be determined in the environment for the at least one detected tactile event using a tactile survey map, at 504. The tactile survey map is a map of one or more surveyed tactile events in a region which is spatially coordinated. The tactile survey map can be substantially similar to the tactile survey map 260, described above with reference to FIG. 2. The surveyed tactile events are the physical response of the recipient vehicle to encountering one or more environmental objects. The surveyed tactile events can include sensor data collected from one or more sensors, such as sensor data collected from an IMU. The surveyed tactile events can be correlated to an event location on the tactile survey map, providing an awareness of the position of the recipient vehicle on the tactile survey map 260, and in the environment. The variations in the tactile event can establish the orientation of the environmental object creating the tactile event.

The accessing of the tactile survey map can be performed as part of a system, such as the tactile localization system 170, described with reference to FIG. 2. The tactile localization system 170 can include a measurement module 220. The measurement module 220 can generally include instructions that function to control the processor 110 to detect at least one tactile event in an environment during the operation of the recipient vehicle. The tactile survey map can be substantially similar to the tactile survey map 260, described with reference to FIG. 2. The environmental objects can be stored as part of an tactile survey map 260. The tactile survey map 260 and the detection information 270 can be stored in a database, such as the database 210, described with reference to FIG. 2.

In further embodiments, the detected tactile event can then be compared to the tactile survey map, the comparison providing a tactile correlation. One or more detected tactile events can be applied to the recipient vehicle, to create a tactile correlation. Tactile correlation refers to the level of correlation on the tactile survey map between tactile events, detected objects, and the recipient vehicle. The method 500 can access or collect sensor information from one or more sources, such as a sensor system. Sensor information, as collected by the method 500, can include information collected remotely, such as through vehicle to infrastructure (V2I) communication or vehicle-to-vehicle (V2V) communication.

The tactile correlation can include the interrelationship of the location and orientation of the detected tactile events. In one example, the tactile correlation includes the temporal difference in tactile signature between two or more detected tactile events. As such, the tactile correlation can include a variety of details about the recipient vehicle and the environment, such as the location, orientation, velocity, acceleration, change in acceleration, wheel position, and other information regarding the recipient vehicle as detected through the tactile event. Thus, the tactile correlation can provide information including the pose of the recipient vehicle, the location of the recipient vehicle in the lane, the global position of the recipient vehicle and actions taken by the recipient vehicle.

The comparison of the tactile events and the creation of the tactile correlation can be performed as part of a system, such as the tactile localization system 170, described with reference to FIG. 2. The tactile localization system 170 can include the comparison module 230. The comparison module 230 can generally include instructions that function to control the processor 110 to compare the detected tactile event to the tactile survey map, the comparison providing a tactile correlation. The detected tactile events can be substantially similar to the detected tactile events, described with reference to FIG. 2. The environmental objects can be stored as part of an tactile survey map 260. The tactile correlation and the detected tactile event can be stored as part of the detection information 270 in the database 210, described with reference to FIG. 2.

A location of the vehicle can be determined in the environment based at least on the event location, at 506. In one embodiment, the event location and the tactile correlation can be used in determining the vehicle location. As above, the tactile event is associated with a specific three (3) dimensional location on the tactile survey map. Thus, the tactile event is associated with an assigned geographical location and is understood to be an event which occurs at the assigned geographical location. Thus, by detecting the tactile event, the recipient vehicle is detecting a location on the tactile survey map. The location of the recipient vehicle can include the geographical location, the lane position, the lane localization (the position of the vehicle within the lane), and others. Further, the tactile event can be expected to be detected differently depending on at least the speed and the direction of the recipient vehicle. As such, the tactile event can provide information on the orientation of at least a portion of the recipient vehicle. For example, a pothole can create a different vibration pattern when the recipient vehicle is travelling at different speeds or approaching from a different position.

The determination of the vehicle location can be performed as part of a system, such as the tactile localization system 170, described with reference to FIG. 2. The tactile localization system 170 can include the localization module 240. The localization module 240 can generally include instructions that function to control the processor 110 to determine, using the event location and the tactile correlation, a vehicle location in the environment. The localization module 240 can use the tactile correlation, as stored, such as in the database 210, to determine which event location is properly associated with the current location of the vehicle.

The vehicle can then be controlled in the environment with relation to the vehicle location, at 508. Once the details of the location are known, the method 500 can provide instructions for controlling the movement of the recipient vehicle. The method 500 can provide guidance to the vehicle or instructions for explicit movement of the vehicle. In one embodiment, the method 500 can forward the location information for the recipient vehicle to further systems or methods for controlling the vehicle. In another embodiment, the method 500 provides instructions to the vehicle, thus directly controlling the movement of the vehicle. The determined location can then be stored as part of the detection information 270, to be used for metrics, refinement of the tactile survey map or for other purposes.

The control of the vehicle based on the vehicle location can be performed as part of a system, such as the tactile localization system 170, described with reference to FIG. 2. The tactile localization system 170 can include the localization module 240. The localization module 240 can generally include instructions that function to navigate the recipient vehicle in the environment using the vehicle location. The localization module 240 can provide instructions to one or more systems, such as the autonomous driving module(s) 160, for controlling the movement of the recipient vehicle.

The method 500 described herein can determine the vehicle location in an environment using tactile data from the environment. As such, the method 500 provides numerous benefits to the operator. The method 500 can provide input to the operator regarding location when visibility is diminished, such as during inclement weather. Further, the method 500 can include guidance to the operator regarding location and directionality, which supplements or enhances other existing systems, which will make information received more reliable.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from an operator (e.g., a human user/driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from an operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module(s) 160 controlling the vehicle 100 by braking, accelerating, and steering without operator input but the operator is to monitor the driving and be vigilant and ready to intervene with controlling the vehicle 100 if the autonomous driving module(s) 160 fail to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include map data 116 and/or sensor data 119. In this context, "map data" refers to any data providing relative proximity between two objects, usable by the vehicle 100, one or more systems of the vehicle 100, or the operator. "Sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, one or more cameras 126 and/or inertial measurement units (IMUs) 127. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator in order to determine a gaze of the operator, an eye track of the operator, and so on.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger) or from external systems, such as from the tactile localization system 170, described above with reference to FIG. 2. The vehicle 100 can include an output system 135. An "output system" includes any device, component, or arrangement or groups thereof that enable information/data to be transmitted to the vehicle or presented to a vehicle passenger (e.g. a person, a vehicle passenger, etc.). The output system 135 can be configured to communicate sensor data and other information to the tactile localization system 170, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the tactile localization system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the tactile localization system 170, and/or the autonomous driving module(s) 160 may control some or all of these vehicle systems 140 and, thus, may be partially or fully autonomous.

The processor(s) 110, the tactile localization system 170, and/or the autonomous driving module(s) 160 can be operably connected to communicate with the various vehicle systems 140 and/or individual components thereof. For example, returning to FIG. 1, the processor(s) 110, the tactile localization system 170, and/or the autonomous driving module(s) 160 can be in communication to send and/or receive information from the various vehicle systems 140 to control the movement, speed, maneuvering, heading, direction, etc. of the vehicle 100. The processor(s) 110, the tactile localization system 170, and/or the autonomous driving module(s) 160 may control some or all of these vehicle systems 140.

The processor(s) 110, the tactile localization system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the tactile localization system 170, and/or the autonomous driving module(s) 160 can control the direction and/or speed of the vehicle 100. The processor(s) 110, the tactile localization system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the tactile localization system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the tactile localization system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A tactile localization system for determining vehicle position, comprising:
   one or more processors; and
   a memory communicably coupled to the one or more processors and storing:
      a measurement module including instructions that when executed by the one or more processors cause the one or more processors to detect, using one or more sensors, a tactile event in an environment, during operation of a vehicle, the tactile event including a tactile signature;
      a comparison module including instructions that when executed by the one or more processors cause the one or more processors to determine an event location in the environment for the detected tactile event using a tactile survey map, the tactile survey map including one or more surveyed tactile events, the one or more surveyed tactile events including a tactile signature, the determining of the event location including at least comparing the tactile signature of the detected tactile event to the tactile signature of the one or more surveyed tactile events; and
      a localization module including instructions that when executed by the one or more processors cause the one or more processors to determine a location of the vehicle in the environment based at least on the determined event location, and to control the vehicle in the environment with relation to the vehicle location.

2. The tactile localization system of claim 1, wherein the tactile survey map is produced by a survey vehicle.

3. The tactile localization system of claim 1, wherein the one or more sensors comprise an inertial measurement unit.

4. The tactile localization system of claim 1, wherein the measurement module further includes instructions to update the tactile survey map using detected tactile events.

5. The tactile localization system of claim 1, wherein the comparison module further comprises instructions to create a tactile correlation between the detected tactile event and the tactile survey map.

6. The tactile localization system of claim 5, wherein the tactile event comprises a first tactile event and a second tactile event, and wherein the tactile correlation includes a correlation formed between the first tactile event associated with a first object and the second tactile event associated with a second object.

7. The tactile localization system of claim 5, wherein the localization module further comprises instructions to determine an orientation of the vehicle using the tactile correlation and the tactile signature.

8. The tactile localization system of claim 1, wherein the detected tactile event comprises a first detected tactile event and a second detected tactile event, and wherein the localization module further comprises instructions to determine a vehicle position between the first detected tactile event and the second detected tactile event.

9. A non-transitory computer-readable medium for determining vehicle position and storing instructions that when executed by one or more processors cause the one or more processors to:
    detect, using one or more sensors, a tactile event in an environment, during operation of a vehicle, the tactile event including a tactile signature;
    determine an event location in the environment for the detected tactile event using a tactile survey map, the tactile survey map including one or more surveyed tactile events, the one or more surveyed tactile events including a tactile signature, wherein determining the event location includes at least comparing the tactile signature of the detected tactile event to the tactile signature of the one or more surveyed tactile events;
    determine a location of the vehicle in the environment based at least on the determine event location; and
    control the vehicle in the environment with relation to the vehicle location.

10. The non-transitory computer-readable medium of claim 9, wherein the tactile survey map is produced by a survey vehicle, and wherein the one or more sensors comprise an inertial measurement unit.

11. The non-transitory computer-readable medium of claim 9, further comprising instructions to update the tactile survey map using detected tactile events.

12. The non-transitory computer-readable medium of claim 9, further comprising instructions to create a tactile correlation between the detected tactile event and the tactile survey map.

13. The non-transitory computer-readable medium of claim 12, further comprises instructions to determine an orientation of the vehicle using the tactile correlation and the tactile signature.

14. The non-transitory computer-readable medium of claim 12, wherein the tactile event comprises a first tactile event and a second tactile event, and wherein the tactile correlation includes a correlation formed between the first tactile event associated with a first object and the second tactile event associated with a second object.

15. The non-transitory computer-readable medium of claim 9, wherein the detected tactile event comprises a first detected tactile event and a second detected tactile event, and further comprising instructions to determine a vehicle position between the first detected tactile event and the second detected tactile event.

16. A method for determining vehicle position, comprising:
    detecting, using one or more sensors, a tactile event in an environment, during operation of a vehicle, the tactile event including a tactile signature;
    determining an event location in the environment for the detected tactile event using a tactile survey map, the tactile survey map including one or more surveyed tactile events, the one or more surveyed tactile events including a tactile signature, wherein determining the event location includes at least comparing the tactile signature of the detected tactile event to the tactile signature of the one or more surveyed tactile events;
    determining a location of the vehicle in the environment based at least on the determined event location; and
    controlling the vehicle in the environment with relation to the vehicle location.

17. The method of claim 16, further comprising updating the tactile survey map using the detected tactile events.

18. The method of claim 16, further comprising creating a tactile correlation, using the detected tactile event and the tactile survey map.

19. The method of claim 16, further comprising detecting one or more anticipated tactile events.

20. The method of claim 16, wherein the detected tactile event comprises a first detected tactile event and a second detected tactile event, and further comprising determining a vehicle position between the first detected tactile event and the second detected tactile event.

* * * * *